US010056107B2

(12) United States Patent
Kurosawa et al.

(10) Patent No.: US 10,056,107 B2
(45) Date of Patent: Aug. 21, 2018

(54) CONTROL DEVICE, MAGNETIC DISK CONTROL SYSTEM, AND CONTROL METHOD FOR CONTROLLING DISK STORAGE DEVICE

(71) Applicant: Renesas Electronics Corporation, Koutou-ku, Tokyo (JP)

(72) Inventors: Minoru Kurosawa, Tokyo (JP); Kichiya Itagaki, Tokyo (JP); Seigi Ishiji, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 15/717,035

(22) Filed: Sep. 27, 2017

(65) Prior Publication Data

US 2018/0096704 A1    Apr. 5, 2018

(30) Foreign Application Priority Data

Sep. 30, 2016    (JP) .................................. 2016-193745

(51) Int. Cl.
| G11B 19/20 | (2006.01) |
| G11B 21/02 | (2006.01) |
| G11B 5/54 | (2006.01) |
| G11B 21/12 | (2006.01) |
| G11B 19/04 | (2006.01) |

(52) U.S. Cl.
CPC ............ *G11B 19/2063* (2013.01); *G11B 5/54* (2013.01); *G11B 19/04* (2013.01);
(Continued)

(58) Field of Classification Search
CPC ......... G11B 5/54–5/55; G11B 5/5521–5/5534; G11B 5/5547; G11B 5/5565;
(Continued)

(56) References Cited

U.S. PATENT DOCUMENTS

| 6,754,027 B2 * | 6/2004 | Hirano | ..................... G11B 5/54 360/75 |
| 6,765,746 B2 * | 7/2004 | Kusumoto | ............... G11B 5/54 360/75 |

(Continued)

FOREIGN PATENT DOCUMENTS

| JP | 2002-298530 A | 10/2002 |
| JP | 2004-178790 A | 6/2004 |
| JP | 2011-248965 A | 12/2011 |

*Primary Examiner* — Wayne Young
*Assistant Examiner* — James L Habermehl
(74) *Attorney, Agent, or Firm* — Sughrue Mion, PLLC

(57) ABSTRACT

A control device is provided which can perform a retraction operation of a head included in a disk storage device with lower power consumption.
The control device of the disk storage device includes a control unit that controls a motor and retracts the head from over a disk to a ramp mechanism when power supply is shut down, an acquisition unit that acquires information related to a moving distance of the head that retracts to the ramp mechanism, and a calculation unit that calculates the moving distance of the head based on the information acquired by the acquisition unit. The control unit switches an operation of the motor from a first retract operation to a second retract operation when determining that the head reaches a first position after passing through an inclined surface of the ramp mechanism based on the moving distance calculated by the calculation unit.

13 Claims, 14 Drawing Sheets

(52) U.S. Cl.
CPC .......... *G11B 19/2081* (2013.01); *G11B 21/02* (2013.01); *G11B 21/12* (2013.01)

(58) Field of Classification Search
CPC ..... G11B 5/5582; G11B 19/04–19/047; G11B 19/20; G11B 19/2063–19/2081; G11B 21/02; G11B 21/12
USPC .............. 360/55, 69, 75, 78.04–78.08, 78.14
See application file for complete search history.

(56) References Cited

U.S. PATENT DOCUMENTS

| | | | |
|---|---|---|---|
| 6,920,007 B2 * | 7/2005 | Tominaga | G11B 21/12 360/75 |
| 7,046,475 B2 * | 5/2006 | Hosokawa | G11B 21/12 360/75 |
| 7,072,135 B2 | 7/2006 | Suzuki | |
| 7,369,346 B2 * | 5/2008 | Yamamoto | G11B 21/12 360/75 |
| 7,477,468 B2 * | 1/2009 | Aoki | G11B 21/12 360/75 |
| 7,483,233 B2 * | 1/2009 | Kim | G11B 21/12 360/75 |
| 2009/0015961 A1 * | 1/2009 | Kusumoto | G11B 21/12 360/75 |

\* cited by examiner

CONTROL DEVICE, MAGNETIC DISK CONTROL SYSTEM, AND CONTROL METHOD FOR CONTROLLING DISK STORAGE DEVICE

CROSS-REFERENCE TO RELATED APPLICATIONS

The disclosure of Japanese Patent Application No. 2016-193745 filed on Sep. 30, 2016 including the specification, drawings and abstract is incorporated herein by reference in its entirety.

BACKGROUND

The present disclosure relates to a control device, and more specifically to a control device of a disk storage device.

It is known that a magnetic disk device performs a retraction operation that retracts a magnetic head from over a magnetic disk when power is shut down. Regarding a technique that controls the retraction operation, for example, Japanese Unexamined Patent Application Publication No. 2002-298530 (Patent Document 1) discloses a configuration in which when a head reaches a predetermined retraction switching position 403, the head is moved to a ramp 16 by using charges accumulated in a retraction capacitor.

Further, Japanese Unexamined Patent Application Publication No. 2004-178790 (Patent Document 2) discloses a configuration in which when power is shut down, a head 16 is unloaded to a ramp 20 by constant voltage driving after the head 16 is caused to reach an inner stopper that is a predetermined position opposite to the ramp 20.

Japanese Unexamined Patent Application Publication No. 2011-248965 (Patent Document 3) discloses a configuration which alternately performs an operation to apply a drive voltage to a voice coil motor VCM and an operation to detect a back electromotive voltage (BEMF) generated in the VCM and sets a value of the drive voltage applied to the VCM according to a magnitude relation between a threshold voltage Vref and the BEMF.

SUMMARY

By the way, in recent years, there are some magnetic disk devices that protect written data by the retraction operation and also protect data to be written as operations performed when power is shut down.

To save data to be written to a magnetic disk to a non-volatile memory such as a flash memory, a period of time according to the amount of data to be written is required. The period of time may be up to several seconds.

To ensure the period of time, it is necessary to use limited remaining charges and rotational energy of a spindle motor for protection of the data to be written as much as possible.

Therefore, to stably protect the data to be written, energy saving of the retraction operation is required.

In this respect, Patent Documents 1 and 2 disclose techniques for enhancing reproducibility of the retraction operation. However, they mention nothing about the energy saving of the retraction operation.

Although Patent Document 3 mentions reduction of power consumption of the retraction operation, further reduction of the power consumption of the retraction operation is required to protect data to be written in a more stable manner.

The present disclosure is made to solve the problems as described above, and an object of the present disclosure in a certain aspect is to provide a control device that can perform a head retraction operation with lower power consumption. An object in another aspect is to provide a magnetic disk control system that can perform a magnetic head retraction operation with low power consumption. An object in further another aspect is to provide a control method of controlling a head retraction operation with lower power The other problems and novel features will become apparent from the description of the present specification and the accompanying drawings.

A control device of a disk storage device according to a certain embodiment includes a control unit that controls a motor and retracts a head from over a disk to a ramp mechanism when power supply is shut down, an acquisition unit that acquires information related to a moving distance of the head that retracts to the ramp mechanism, and a calculation unit that calculates the moving distance of the head based on the information acquired by the acquisition unit. The control unit switches an operation of the motor from a first retract operation to a second retract operation when determining that the head reaches a first position after passing through an inclined surface of the ramp mechanism based on the moving distance calculated by the calculation unit.

The control device of the disk storage device according to the embodiment can reduce power consumption required for the retraction operation more than ever before.

DETAILED DESCRIPTION

Figure 1:
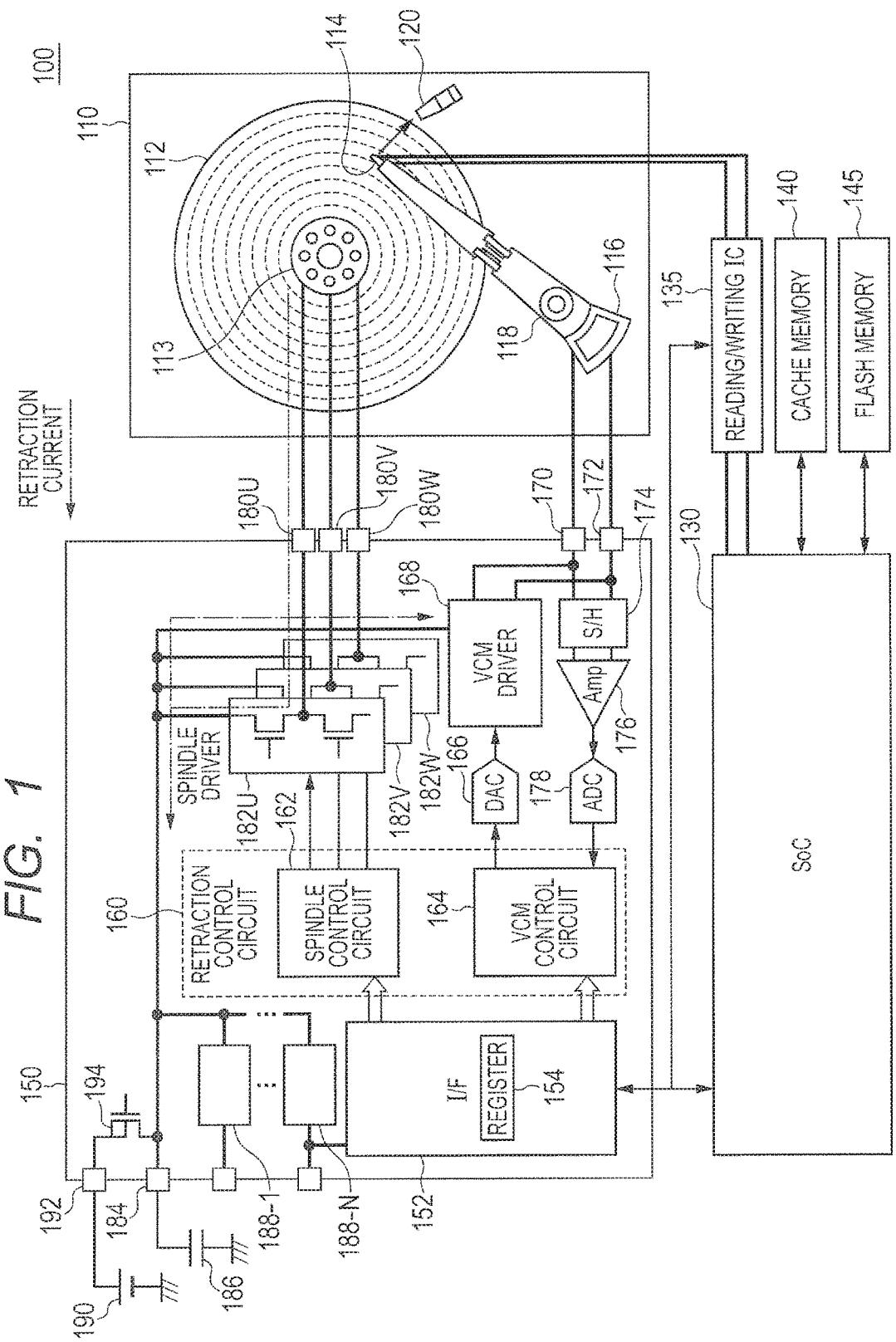
FIG. 1 is a diagram for explaining a configuration of a control system according to a related art.

Hereinafter, embodiments of the present invention will be described with reference to the drawings. In the description below, the same components are given the same reference numerals. Their names and functions are also the same. Therefore, detailed description thereof will not be repeated. In a case where a plurality of embodiments are described, technical features disclosed in each embodiment can be appropriately combined.

[A. Related Art]

(a1. Configuration)

FIG. 1 is a diagram for explaining a configuration of a control system. 100 according to a related art. Referring to FIG. 1, the control system 100 includes a hard disk drive 110, a SoC (System on Chip) 130, and a motor driver IC (Integrated Circuit) 150 as main constituent elements.

The hard disk drive 110 includes a magnetic disk 112, a spindle motor 113, a magnetic head 114, a VCM (Voice Coil Motor) 116, an arm 118, and a ramp mechanism 120. The magnetic disk 112 is configured to be able to store data. The magnetic head 114 is a device to read data stored in the magnetic disk 112 and write data to the magnetic disk 112.

The SoC 130 is electrically coupled to each of a reading/writing IC 135, a cache memory 140, and a flash memory 145.

The motor driver IC 150 includes an interface (I/F) 152, a retraction control circuit 160, a DAC (Digital to Analog Converter) 166, a VCM driver 168, a sample/hold circuit 17 4, an amplifier 17 6, and an ADC (Analog to Digital Converter) 178. The motor driver IC 150 further includes spindle drivers 182U, 182V, and 182W, a capacitor 186, regulators 188-1, . . . , and 188-N (N is a natural number), and a switch 194. In a certain aspect, the switch 194 can be configured by an FET (Field effect transistor) element. Further, the motor driver IC 150 includes VCM terminals 170 and 172 that are coupled to the VCM 116, spindle terminals 180U, 180V, and 180W that are coupled to spindle motor 113, a protection power supply terminal 184 that is coupled to the capacitor 186, and a power supply terminal 192 that is coupled to an external power supply 190. Hereinafter, the spindle terminals 180U, 180V, and 180W are collectively referred to as "spindle terminal 180". Similarly, the spindle drivers 182U, 182V, and 182W are collectively referred to as "spindle driver 182".

The interface 152 has a register 154. The retraction control circuit 160 has a spindle control circuit 162 and a VCM control circuit 164.

(a2. Normal Operation)

An operation in normal time of the control system 100 according to the related art will be described. When the switch 194 is in an ON state, an electric power is supplied to the motor driver IC 150 from the external power supply 190. The spindle control circuit 162 and the VCM control circuit 164 in the motor driver IC 150 control the spindle motor 113 and the VCM 116 of the hard disk drive 110, respectively, by using the electric power supplied from the external power supply 190. When the switch 194 is in the ON state, the capacitor 186 stores an electrical charge supplied from the external power supply 190.

As an example, control of writing data to the magnetic disk 112 will be described. When the SoC 130 receives an input of an instruction to write data, the SoC outputs a control signal to the spindle control circuit 162 through the interface 152.

The spindle control circuit 162 supplies an electric power that is synchronized and rectified by the spindle driver 182 to the spindle motor 113 through the spindle terminal 180 according to the inputted control signal. Accordingly, the spindle motor 113 rotates at a speed according to the control signal.

The SoC 130 acquires servo information to be embedded in the magnetic disk 112 through the reading/writing IC 135 according to the input of an instruction to write data. The SoC 130 outputs a control signal for moving a position of the magnetic head to a data writing position to the VCM control circuit 164 based on the servo information.

The VCM control circuit 164 outputs an instruction according to the inputted control signal to the VCM driver 168 through the EAC 166. The VCM driver 168 supplies an electric power according to the inputted instruction to the VCM 116 through the VCM terminals 170 and 172. Thereby, the magnetic head 114 moves in a radial direction of the magnetic disk 112 and reaches the data writing position by an action of the VCM 116 through the arm 118. The magnetic head 114 moves while being slightly floated from the magnetic disk 112 by an air flow generated by rotation of the magnetic disk 112. When the magnetic head 114 reaches a desired position, the SoC 130 writes data to the magnetic disk 112 by the reading/writing IC 135, (a3. Retraction Operation)

Next, the retraction operation of the control system 100 according to the related art will be described. When power supply from the external power supply 190 to the motor driver IC 150 is shut down (hereinafter also referred to as "power shutdown"), rotation frequency of the magnetic disk 112 gradually decreases. Thereby, an air flow over the magnetic disk 112 weakens and the buoyancy of the magnetic head 114 decreases. As a result, the magnetic disk 112 and the magnetic head 114 come into contact with each other and data recorded on a portion of the magnetic disk 112 where the magnetic disk 112 and the magnetic head 114 come into contact with each other is destroyed.

Therefore, to protect data recorded on the magnetic disk 112, it is necessary to retract the magnetic head 114 to the ramp mechanism 120 before the rotation frequency of the magnetic disk 112 decreases. A series of operations to retract the magnetic head 114 to the ramp mechanism 120 is referred to as a retraction operation.

When the power shutdown occurs, the switch 194 becomes an OFF state in response to a decrease in the power supplied from the external power supply 190. In a certain aspect, the switch 194 is an FET element and the gate of the switch 194 is coupled to an output of the external power supply 190.

The motor driver IC 150 supplies a charge accumulated in the capacitor 186 to each device through the protection power supply terminal 18 4 in response to the power shutdown, that is, in response to switching of the switch 194 to the OFF state. Further, in response to the power shutdown, the motor driver IC 150 rectifies a back electromotive force generated in a coil of the spindle motor 113 by the spindle driver 182 and then supplies the rectified back electromotive force to each device. The motor driver IC 150 supplies power after stabilizing the voltage of the power to an appropriate voltage through the regulators 188-1, . . . , and 188-N so that the voltage meets an input voltage range of a device to which the power is supplied. The devices to which the power is supplied may include devices outside the motor driver IC 150, such as the SoC 130, in addition to devices inside the motor driver IC 150, such as the VCM control circuit 164.

When the power shutdown occurs, the VCM control circuit 164 drives the VCM 116 by using the back electromotive force of the spindle motor 113 and causes the magnetic head 114 to retract to the ramp mechanism 120.

When the power shutdown occurs, the SoC 130 stores data to be written in the flash memory 145 by using the charge accumulated in the capacitor 186 and the back electromotive force of the spindle motor 113. Thereby, the data to be written is protected.

Figure 2:
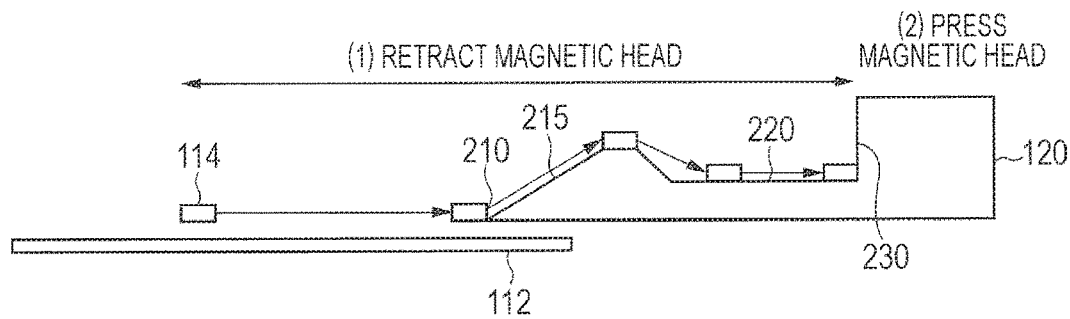
FIG. 2 is a diagram for explaining a retraction operation.

FIG. 2 is a diagram for explaining the retraction operation. Referring to FIG. 2, the ramp mechanism 120 has a ramp front 210 facing the spindle motor 113, an inclined surface 215, a retraction surface 220, and a ramp end 230. The ramp end 230 is a surface approximately perpendicular to a rotating surface of the magnetic disk 112. The ramp end 230 is arranged further from the magnetic disk 112 than the inclined surface 215.

The retraction (retract) operation of the magnetic head 114 includes a first retract operation that moves the magnetic head to the ramp end 230 or to a position close to the ramp end 230 and a second retract operation that presses the magnetic: head 114 against the ramp end 230.

The VCM control circuit 164 starts the first retract operation in response to the power shutdown (switching of the switch 194 to the OFF state). When the VCM control circuit 164 determines that the magnetic head 114 reaches the ramp end 230, the VCM control circuit 164 changes the operation of the VCM 116 from the first retract operation to the second retract operation.

The VCM control circuit 164 determines whether or not the magnetic head 114 reaches the ramp end 230 based on the magnitude of a back electromotive force generated in a coil of the VCM 116. The magnitude of the back electromotive force generated in the coil of the VCM 116 is proportional to a moving speed of the magnetic head 114. By using this characteristic, the VCM control circuit 164 determines that the magnetic head 114 reaches the ramp end 230 when the magnitude of the back electromotive force generated in the VCM 116 becomes substantially zero (for example, smaller than 50 mV).

Figure 3:
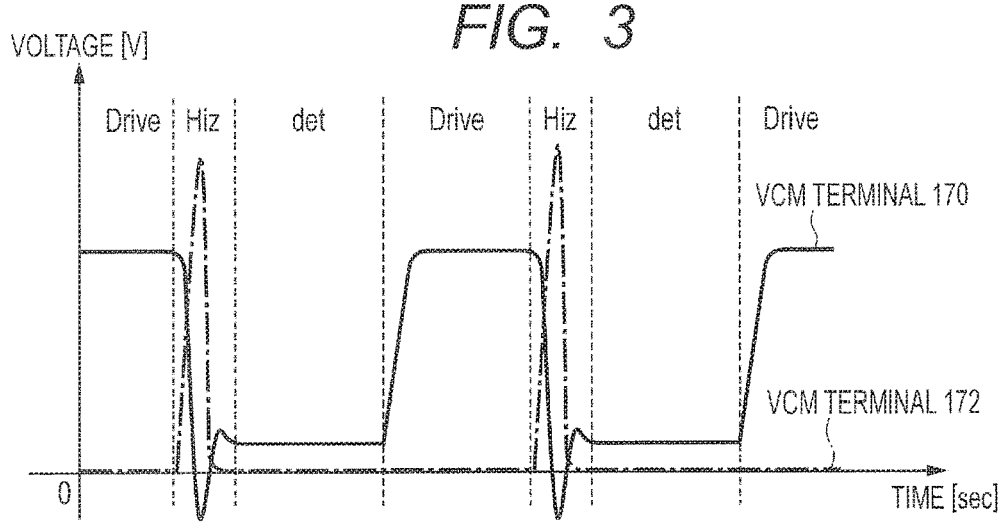
FIG. 3 is a diagram for explaining a measurement of back electromotive force.

FIG. 3 is a diagram for explaining a measurement of the back electromotive force. The VCM control circuit 164 repeats a Drive period, a Hiz period, and a det period in the first retract operation. In the Drive period, the VCM control circuit 164 applies a voltage to the VCM 116. Hereinafter, a setting value of the voltage that the VCM control circuit 164 applies to the VCM 116 is defined as a "VCM drive voltage". In the Hiz period, the VCM control circuit 164 stops applying voltage to the VCM 116 and waits until a voltage applied to the VCM terminal 172 is stabilized. In the det period, the VCM control circuit 164 measures a potential difference generated between the VCM terminals 170 and 172, that is, the back electromotive force generated in the VCM 116 (hereinafter also referred to as a "VCM back electromotive force".

In the first retract operation, the VCM control circuit 164 controls the magnitude of the VCM drive voltage so that the magnitude of the VCM back electromotive force becomes constant. In other words, the VCM control circuit 164 controls the magnitude of the VCM drive voltage so that a moving speed of the VCM 116 becomes constant. For example, when the magnitude of the VCM back electromotive force measured in the det period is lower than a predetermined value, the VCM control circuit 164 raises the VCM drive voltage applied to the VCM 116 in the Drive period immediately after the det period higher than the VCM drive voltage applied in the previous Drive period.

Figure 4:
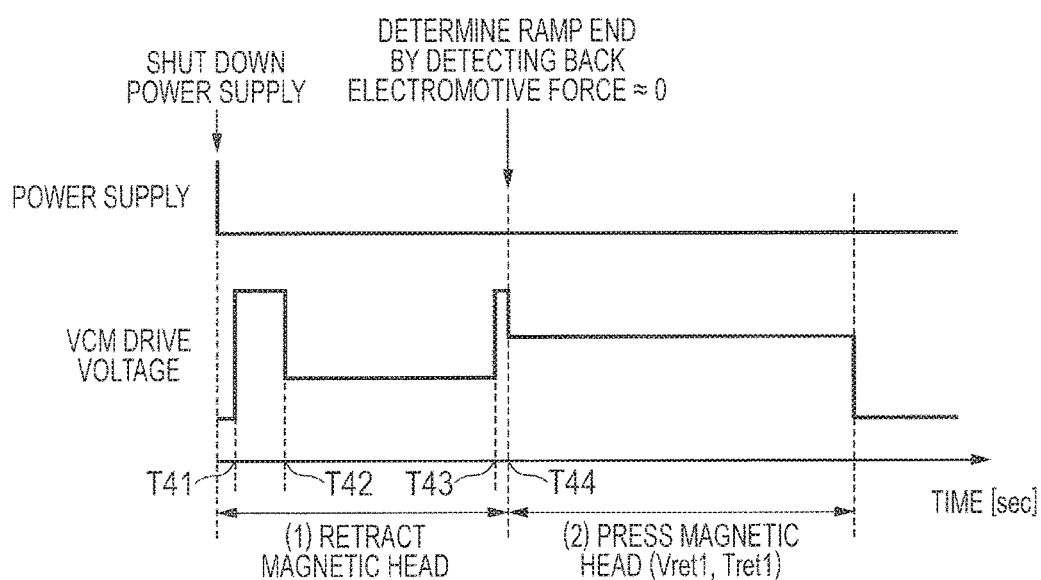
FIG. 4 is a diagram for explaining a voltage applied to VCM during a retraction operation according to the related art.

FIG. 4 is a diagram for explaining a voltage applied to the VCM 116 during the retraction operation according to the related art. In FIG. 4, for ease of description, the VCM drive voltage is constant in a certain period. However, in practice, the Drive period, the Hiz period, and the det period are repeated as in FIG. 3.

Referring to FIG. 4, in the first retract operation (corresponding to "retract magnetic head" in FIG. 4), the VCM control circuit 164 controls the magnitude of the VCM drive voltage so that the VCM back electromotive force becomes a predetermined value. In the example of FIG. 4, the magnetic head 114 moves in a direction opposite to the direction to the ramp mechanism 120 (a direction to the spindle motor 113) when the power is shut down. Therefore, in an initial period (time T41 to time T42) of the first retract operation, the VCM control circuit 164 applies a high VCM drive voltage to the VCM 116 in order to move the magnetic head 114 in a direction to the ramp mechanism 120.

In a late period (time T43 to time T44) of the first retract operation, the VCM control circuit 164 applies a high VCM drive voltage so that the magnetic head 114 maintains a constant speed on the inclined surface 215 of the ramp mechanism 120.

When the VCM back electromotive force becomes substantially zero, the VCM control circuit 164 determines that the magnetic head 114 reaches the ramp end 230 and switches the operation of the VCM 116 from the first retract operation to the second retract operation.

However, there is a possibility that the VCM control circuit 164 switches the operation of the VCM 116 from the first retract operation to the second retract operation even when the magnetic head 114 does not reach the ramp end 230.

This is because the VCM control circuit 164 determines that a point where the VCM back electromotive force becomes substantially zero is the ramp end 230. More specifically, the moving speed of the magnetic head 114 temporarily decreases when the magnetic head 114 passes the inclined surface 215. Thereby, the VCM back electromotive force also temporarily decreases. Therefore, there is a possibility that the VCM control circuit 164 falsely recognizes that the magnetic head 114 reaches the ramp end 230 even though the magnetic head 114 is actually on the inclined surface 215.

Even when the VCM control circuit 164 according to the related art performs the false recognition described above in the second retract operation (corresponding to "press magnetic head" in FIG. 4), the VCM control circuit 164 applies a high VCM drive voltage for a long time so as to be able to appropriately retract the magnetic head 114. More specifically, the VCM control circuit 164 applies a high VCM drive voltage for the magnetic head 114 to pass through the inclined surface 215 for a long time in order to prevent the magnetic head 114 from popping out to the inclined surface 215 from the retraction surface 220 by collision between the magnetic head 114 and the ramp end 230. Therefore, the power consumption required by the VCM control circuit 164 according to the related art to perform the second retract operation may be two times or more of the power consumption required to perform the first retract operation. Hereinafter, the VCM drive voltage applied by the VCM control circuit 164 in the second retract operation is referred to as a voltage Vret1 and a time for which the voltage Vret1 is applied is referred to as a time Tret1.

Figure 5:
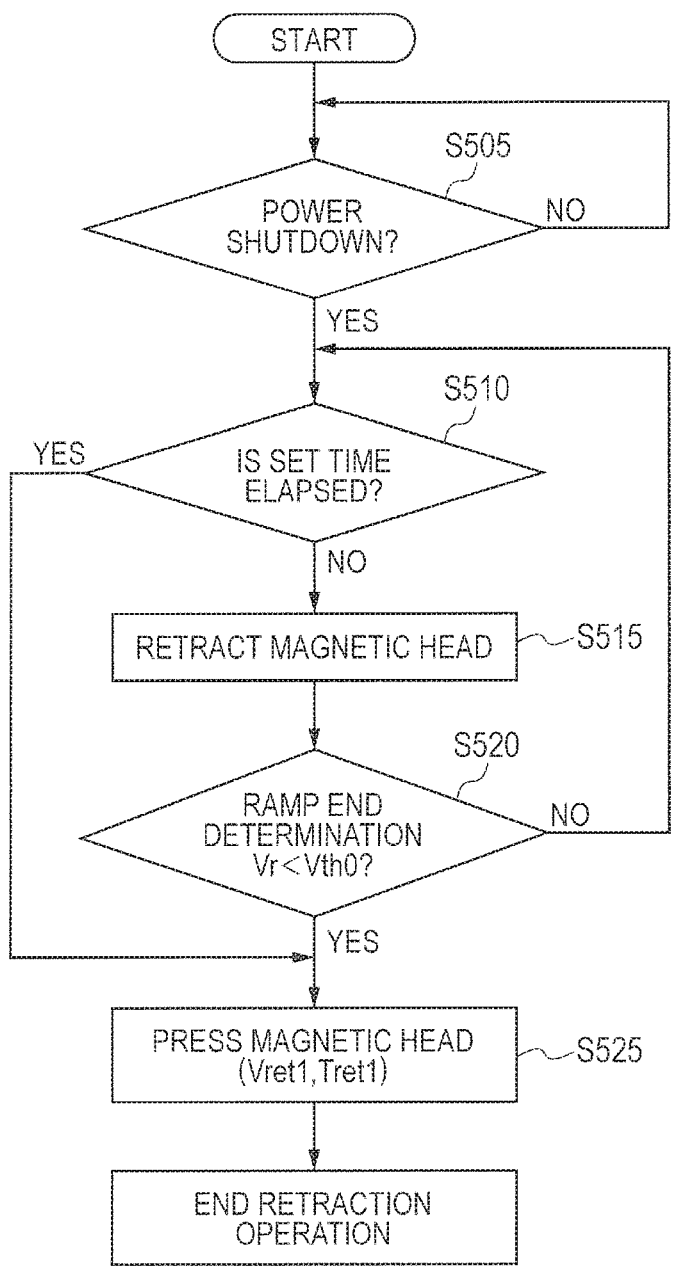
FIG. 5 is a flowchart for explaining a retraction operation in a control system according to the related art.

FIG. 5 is a flowchart for explaining the retraction operation in the control system 100 according to the related art. A series of processing steps shown in FIG. 5 are performed in the VCM control circuit 164.

In step S505, the VCM control circuit 164 determines whether or not a power shutdown occurs. When the VCM control circuit 164 determines that the power shutdown occurs (YES in step S505), the VCM control circuit 164 advances the processing to step S510.

In step S510, the VCM control circuit 164 determines whether or not a set time has elapsed since the power shutdown occurred. When the VCM control circuit 164 determines that the set time has not elapsed (NO in step S510), the VCM control circuit 164 advances the processing to step S515. Otherwise (YES in step S510), the VCM control circuit 164 advances the processing to step S525.

In step S515, the VCM control circuit 164 starts the first retract operation that moves the magnetic head 114 to the ramp end 230 at a constant speed.

In step S520, the VCM control circuit 164 determines whether or not a VCM back electromotive force Vr is lower than a threshold voltage Vth0 (for example, 50 mV). When the VCM control circuit 164 determines that the VCM back electromotive force Vr is lower than the threshold voltage Vth0 (YES in step S520), the VCM control circuit 164 advances the processing to step S525. Otherwise (NO in step S520), the VCM control circuit 164 returns the processing to step S510.

In step S525 the VCM control circuit 164 performs the second retract operation that presses the magnetic head 114 against the ramp end 230. More specifically, the VCM control circuit 164 applies the voltage Vret1 to the VCM 116 for the time Tret1. When the VCM control circuit 164 completes the second retract operation, the VCM control circuit 164 ends a series of retraction operations.

As described above, the motor driver IC 150 according to the related art requires a lot of power consumption in the second retract operation. The inventors of the present application found that the power consumption consumed in the second retract operation occupies a great portion of the power consumed by the retraction operation. Therefore, there is a case where the SoC 130 cannot secure power consumption used to protect data to be written depending on the amount of the data to be written. Hereinafter, a control system according to an embodiment will be described to solve these problems.

[B. Technical Idea]

Figure 6:
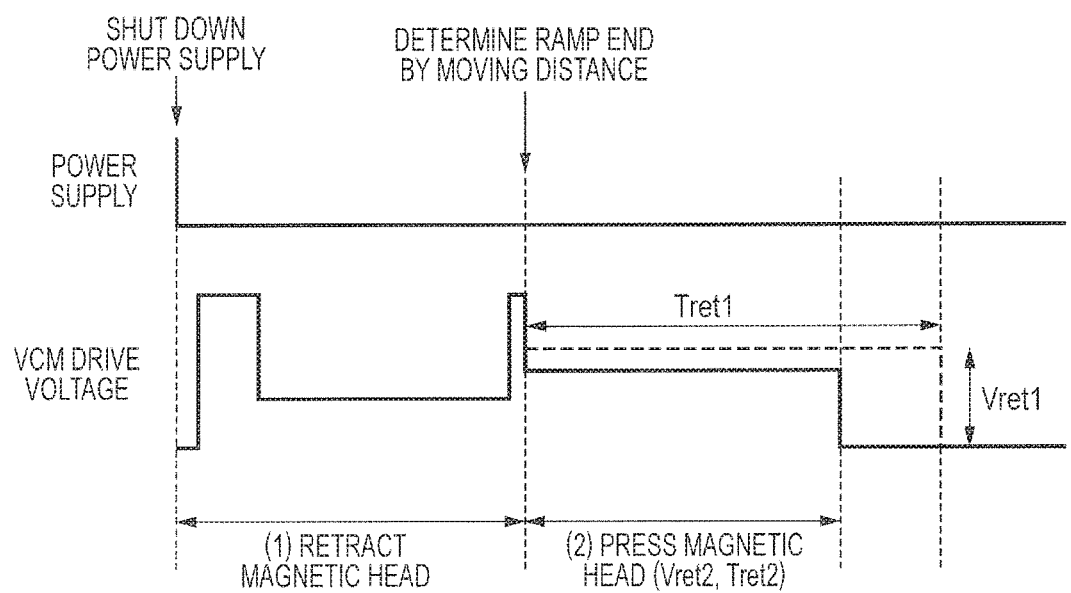
FIG. 6 is a diagram for explaining a control overview of a retraction operation according to an embodiment.

FIG. 6 is a diagram for explaining a control overview of a retraction operation according to an embodiment. Referring to FIG. 6, the control system according to the embodiment determines whether or not the magnetic head 114 reaches the ramp end 230 based a moving distance of the magnetic head 114 instead of the magnitude of the VCM back electromotive force.

Therefore, when the moving speed of the magnetic head 114 temporarily decreases due to the inclined surface 215, the control system according to the embodiment does not falsely recognize that the magnetic head 114 reaches the ramp end 230. In other words, the control system, according to the embodiment can more accurately determine whether or not the magnetic head 114 reaches the ramp end 230 than the control system according to the related art.

According to the above description, the control system according to the embodiment can determine that the magnetic head 114 reliably passes through the inclined surface 215 and perform switching from the first retract operation to the second retract operation. Therefore, a voltage Vret2 applied by the control system according to the embodiment to the VCM 116 in the second retract operation can be set to lower than or equal to the voltage Vret1 applied by the control system according to the related art.

Further, the control system according to the embodiment can determine that the magnetic head 114 reliably reaches close to the ramp end 230 and perform switching from the first retract operation to the second retract operation. Therefore, a time Tret2 for which the voltage Vret2 is applied by the control system according to the embodiment to the VCM 116 in the second retract operation can be set to smaller than or equal to the time Tret1 for which the voltage Vret1 is applied by the control system according to the related art.

Thereby, the control system according to the embodiment can reduce the power consumption required for the retraction operation as compared with the control system according to the related art. As a result, the control system according to the embodiment can increase the power assigned to protection of the data to be written. As a result, the control system according to the embodiment can protect the data to be written in a more stable manner. Hereinafter, configuration and control of the control system, will be described.

[C. First Embodiment]

(c1. Configuration)

Figure 7:
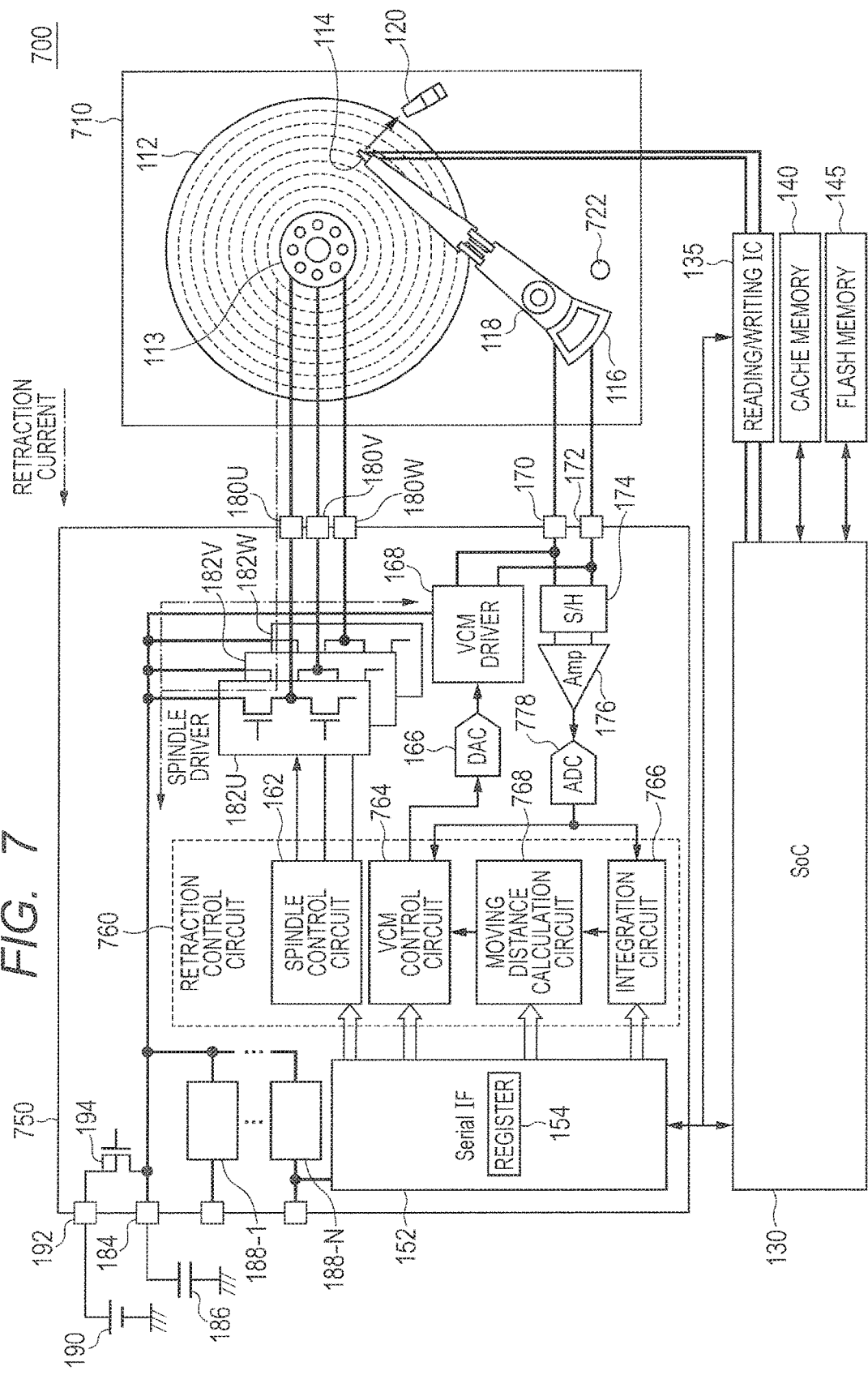
FIG. 7 is a diagram for explaining a configuration example of a control system according to a first embodiment.

FIG. 7 is a diagram for explaining a configuration example of a control system 700 according to a first embodiment. Parts to which the same reference numerals as those in FIG. 1 are given are the same as those described above, so that the parts will not be described again.

Referring to FIG. 7, the control system 700 includes a hard disk drive 710, a SoC 130, and a motor driver IC 750.

The hard disk drive 710 is different from the hard disk drive 110 in that the hard disk drive 710 includes an inner stopper 722. The inner stopper 722 limits (stops) movement of the magnetic head 114 by preventing the magnetic head 114 from moving further inward from the innermost side of a storage area of the magnetic disk 112.

The motor driver IC 750 includes a retraction control circuit 760. The retraction control circuit 760 includes an integration circuit 766 and a moving distance calculation circuit 768. An ADC 778 converts analog data inputted from, an amplifier 176 into digital data and outputs a conversion result to the integration circuit 766 and a VCM control circuit 764. The motor driver IC 750 is different from the motor driver IC 150 according to the related art in these respects.

The integration circuit 766 integrates a VCM back electromotive force inputted from the ADC 778 and outputs a calculation result of the integration to the moving distance calculation circuit 768. As described above, the VCM back electromotive force is proportional to the moving speed of the magnetic head 114. The moving distance calculation circuit 768 calculates the moving distance of the magnetic head 114 by multiplying the calculation result inputted from the integration circuit 766 by a predetermined coefficient. The moving distance calculation circuit 768 outputs the calculated moving distance of the magnetic head 114 to the VCM control circuit 764. The predetermined coefficient is a design value.

The VCM control circuit 764 determines a timing of changing the retract operation from the first retract operation to the second retract operation based on the moving distance of the magnetic head 114 inputted from the moving distance calculation circuit 768, (c2. Retraction Operation)

Figure 8:
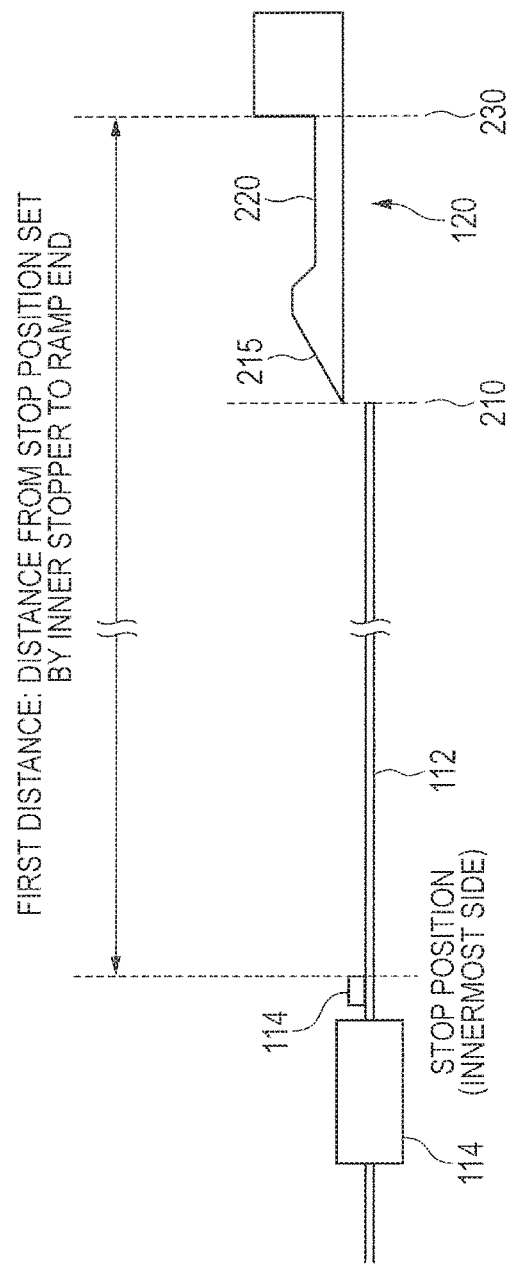
FIG. 8 is a diagram for explaining switching from a first retract operation to a second retract operation according to the first embodiment.

FIG. 8 is a diagram for explaining the switching from the first retract operation to the second retract operation according to the first embodiment. Referring to FIG. 8, when the power shutdown occurs, the VCM control circuit 764 moves the magnetic head 114 to a position where the movement of the magnetic head 114 is restricted by the inner stopper 722 (hereinafter also referred to as a "stop position"). As an example, the VCM control circuit 764 sets the VCM drive voltage and a period for which the VCM drive voltage is applied so that the magnetic head 114 can reach the stop position even when the magnetic head 114 is located at the outermost side of the storage area of the magnetic disk.

After the magnetic head 114 reaches the stop position, the VCM control circuit 764 starts the first retract operation that moves the magnetic head 114 toward the ramp mechanism 120. The VCM control circuit 764 performs control so that the moving speed of the magnetic head 114 in the first retract operation becomes a predetermined speed. The integration circuit 766 starts integration of the VCM back electromotive force when the first retract operation is started. Accordingly, the moving distance calculation circuit 768 starts calculation of the moving distance of the magnetic head 114. In this way, the motor driver IC 150 realizes reliable control by calculating a moving distance from a predetermined position.

A distance from the stop position to the ramp end 230 is defined as a "first distance". The first distance is a design value. The VCM control circuit 764 changes the retract operation from the first retract operation to the second retract operation when the moving distance of the magnetic head 114 inputted from the moving distance calculation circuit 768 becomes substantially the same as the first distance (for example, 99% or more of the first distance).

Figure 9:
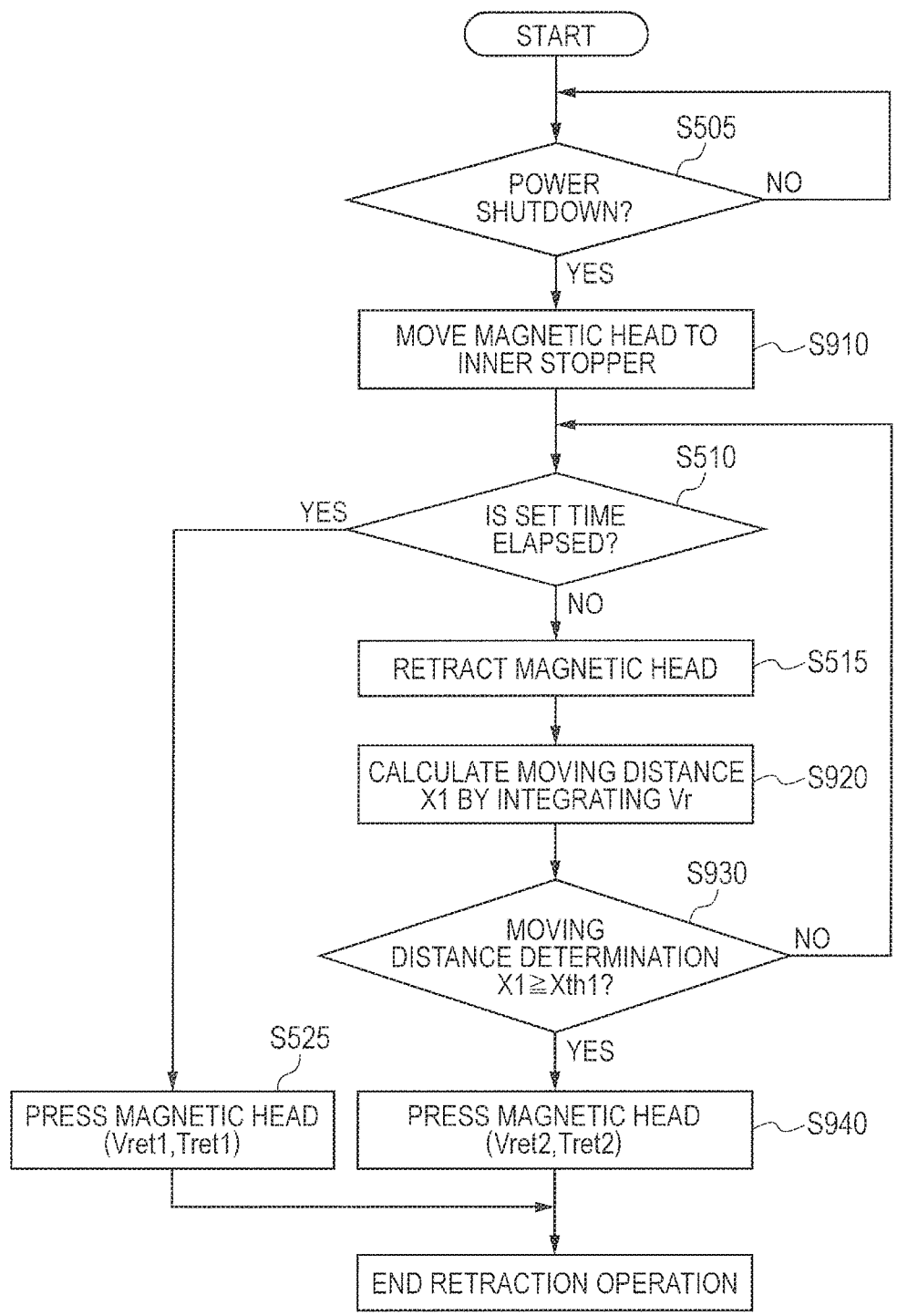
FIG. 9 is a flowchart for explaining control of a retraction operation according to the first embodiment.

FIG. 9 is a flowchart for explaining control of the retraction operation according to the first embodiment. The processing shown in FIG. 9 is performed by the retraction control circuit 760. Parts to which the same reference numerals as those in FIG. 5 are given are the same as those described above, so that the parts will not be described again. This premise is the same for the flowcharts described below.

In step S910, the VCM control circuit 764 moves the magnetic head 114 to the stop position according to occurrence of power shutdown.

In step S920, the integration circuit 766 integrates the VCM back electromotive force Vr used as speed information of the magnetic head 114 and the moving distance calculation circuit 768 calculates a moving distance X1 of the magnetic head 114. The moving distance X1 corresponds to a distance from the stop position to the magnetic head 114.

In step S930, the VCM control circuit 764 determines whether or not the moving distance X1 is greater than or equal to a threshold distance Xth1 (for example, 99% of the first distance). When the VCM control circuit 764 determines that the moving distance X1 is greater than or equal to the threshold distance Xth1 (YES in step S930), the VCM control circuit 764 advances the processing to step S940. Otherwise (NO in step S930), the VCM control circuit 764 returns the processing to step S510.

In step S940, the VCM control circuit 764 performs the second retract operation that applies the voltage Vret2 to the VCM 116 for the time Tret2. As described above, the voltage Vret2 is set lower than or equal to the voltage Vret1 and the time Tret2 is set lower than or equal to the time Tret1.

According to the above description, the VCM control circuit 764 can reliably determine that the magnetic head 114 reaches close to the ramp end 230 based on the moving distance of the magnetic head 114 from the stop position. Therefore, the motor driver IC 750 can reduce the power consumption required for the second retreat operation as compared with the motor driver IC 150 according to the related art. As a result, the SoC 130 according to the control system 7 00 can protect the data to be written in a more stable manner than the SoC 130 according to the control system 100. Further, the motor driver IC 150 calculates the moving distance of the magnetic head 114 based on the VCM back electromotive force. Therefore, it is not necessary to provide a new sensor or the like for calculating the moving distance of the magnetic head 114 in the hard disk drive 110, In step S525, the VCM control circuit 764 performs the second retract operation that applies the voltage Vret1 to the VCM 116 for the time Tret1. However, the operation of this step is not limited to this. For example, when the VCM control circuit 764 determines that the magnetic head 114 is passing through the inclined surface 215 based on the moving distance X1 at a time point when the VCM control circuit 764 determines that a set time has elapsed, the VCM control circuit 764 may perform a second retract operation that applies a voltage Vret3 to the VCM 116 for a time Tret3. The voltage Vret3 and the time Tret3 satisfy relationships of Vret2≤Vret3≤Vret1 and Tret2≤Tret3≤Tret1, respectively. According to the above configuration, it is possible to reduce the power consumption required for the second retract operation when it is determined that the set time has elapsed.

In the above description, a control example of the retraction operation in the hard disk drive 110 (magnetic disk storage device) is described. However, the control example can be applied to a retraction operation of another device. The other device includes a disk that stores data, a head that writes and reads data to and from the disk, and a ramp mechanism that prevents the head and the disk from coming into contact with each other.

[D. Second Embodiment]

In the first embodiment, whether or not the magnetic head 114 reaches (close to) the ramp end 230 is determined based on only the moving distance. In a second embodiment, a determination by the VCM back electromotive force is further performed in addition to the determination by the moving distance of the magnetic head 114. A basic configuration of a control system according to the second embodiment is substantially the same as the basic configuration of the control system according to the first embodiment, and therefore only differences between them will be described.

Figure 10:
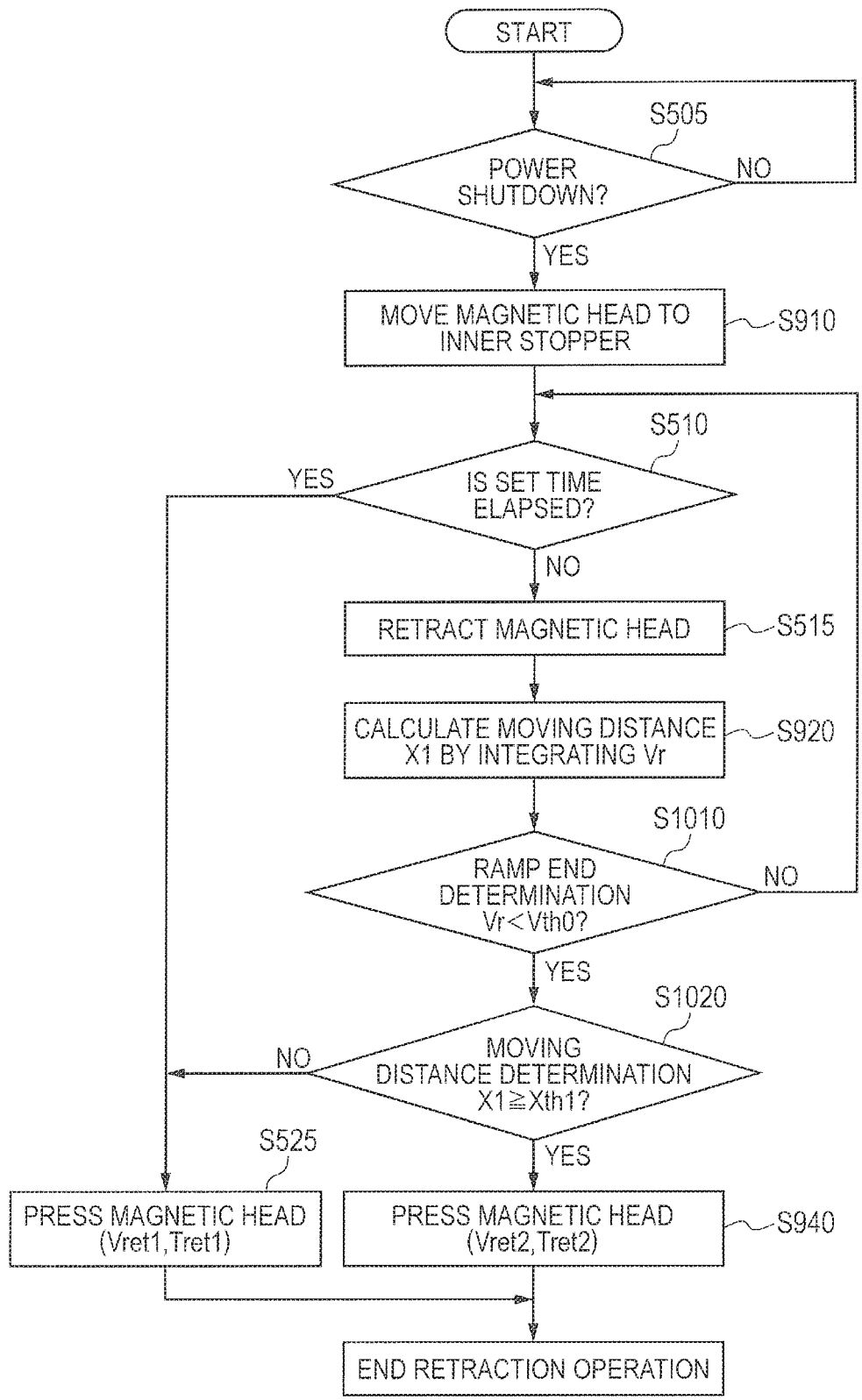
FIG. 10 is a flowchart for explaining control of a retraction operation according to a second embodiment.

FIG. 10 is a flowchart for explaining control of a retraction operation according to the second embodiment. Parts to which the same reference numerals as those in FIG. 9 are given are the same as those described above, so that the parts will not be described again.

In step S1010, the VCM control circuit 764 determines whether or not the VCM back electromotive force Vr is lower than the threshold voltage Vth0 (for example, 50 mV). The threshold voltage Vth0 is held by the VCM control circuit 764 or another device. When the VCM control circuit 764 determines that the VCM back electromotive force Vr is lower than the threshold voltage Vth0 (YES in step S1010), the VCM control circuit 764 advances the processing to step S1020. Otherwise (NO in step S1010), the VCM control circuit 764 returns the processing to step S510.

In step S1020, the VCM control circuit 764 determines whether or not the moving distance X1 of the magnetic head 114 is greater than or equal to the threshold distance Xth1. When the VCM control circuit 764 determines that the moving distance X1 is greater than or equal to the threshold distance Xth1 (YES in step S1020), the VCM control circuit 764 advances the processing to step S940. Otherwise (NO in step S930), the VCM control circuit 764 advances the processing to step S525.

According to the above description, the motor driver IC according to the second embodiment determines whether or not the magnetic head 114 reaches the ramp end 230 based the moving distance X1 of the magnetic head 114 and the VCM back electromotive force. Therefore, the motor driver IC according to the second embodiment can more improve the reliability of the above determination than the motor driver IC according to the first embodiment.

In another aspect, when it is determined that the moving distance X1 is smaller than the threshold distance Xth1 (NO in step S1020), the VCM control circuit 764 may return the processing to step S510.

[E. Third Embodiment]

Figure 11:
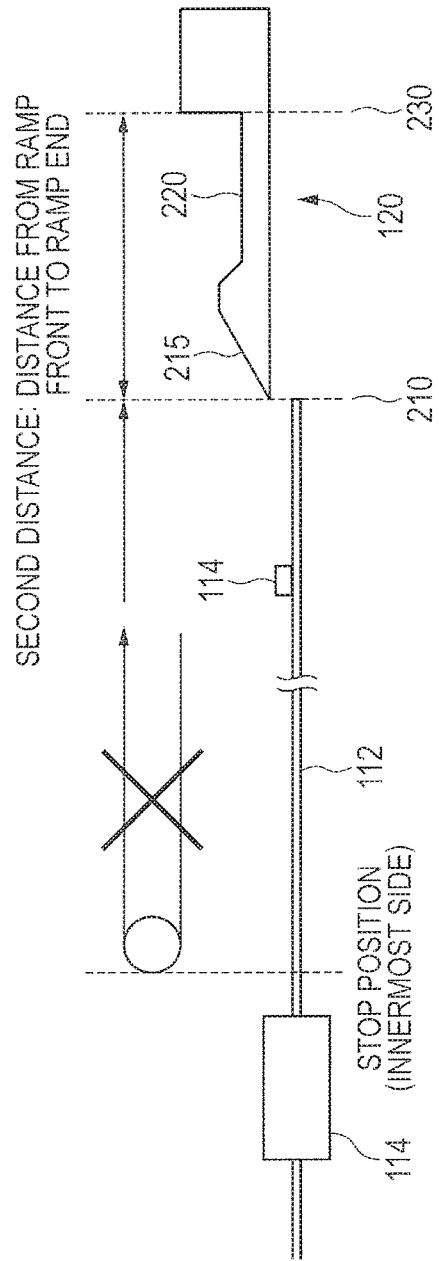
FIG. 11 is a diagram for explaining a control overview of a retraction operation according to a third embodiment.

FIG. 11 is a diagram for explaining a control overview of a retraction operation according to a third embodiment, in the first and the second embodiments, the magnetic head 114 is returned to the stop position in response to the power shutdown. In other words, in these embodiments, the magnetic head 114 is moved in a direction opposite to the direction to the ramp mechanism 120 in order to retract the magnetic head 114 to the ramp mechanism 120.

This operation is performed to improve reliability of determination whether or not the magnetic head 114 reaches the ramp end 230 by performing the determination by using the moving distance of the magnetic head 114 from a predetermined position (the stop position).

In the third embodiment, the predetermined position is set to the ramp front 210. The VCM control circuit 764 according to the third embodiment calculates the moving distance of the magnetic head 114 from the ramp front 210, and when the moving distance becomes substantially equal to a second distance (a distance from the ramp front 210 to the ramp end 230), the VCM control circuit 764 switches the retract operation from the first retract operation to the second retract operation.

According to the above description, the magnetic head 114 does not move in a direction opposite to the direction to the ramp mechanism 120 in the retraction operation. Therefore, the control system according to the third embodiment can further reduce the power consumption required for the retraction operation. Hereinafter, the above control will be described in further detail. A basic configuration of the control system according to the third embodiment is substantially the same as the basic configuration of the control system according to the first embodiment, and therefore only differences between them, will be described.

Figure 12:
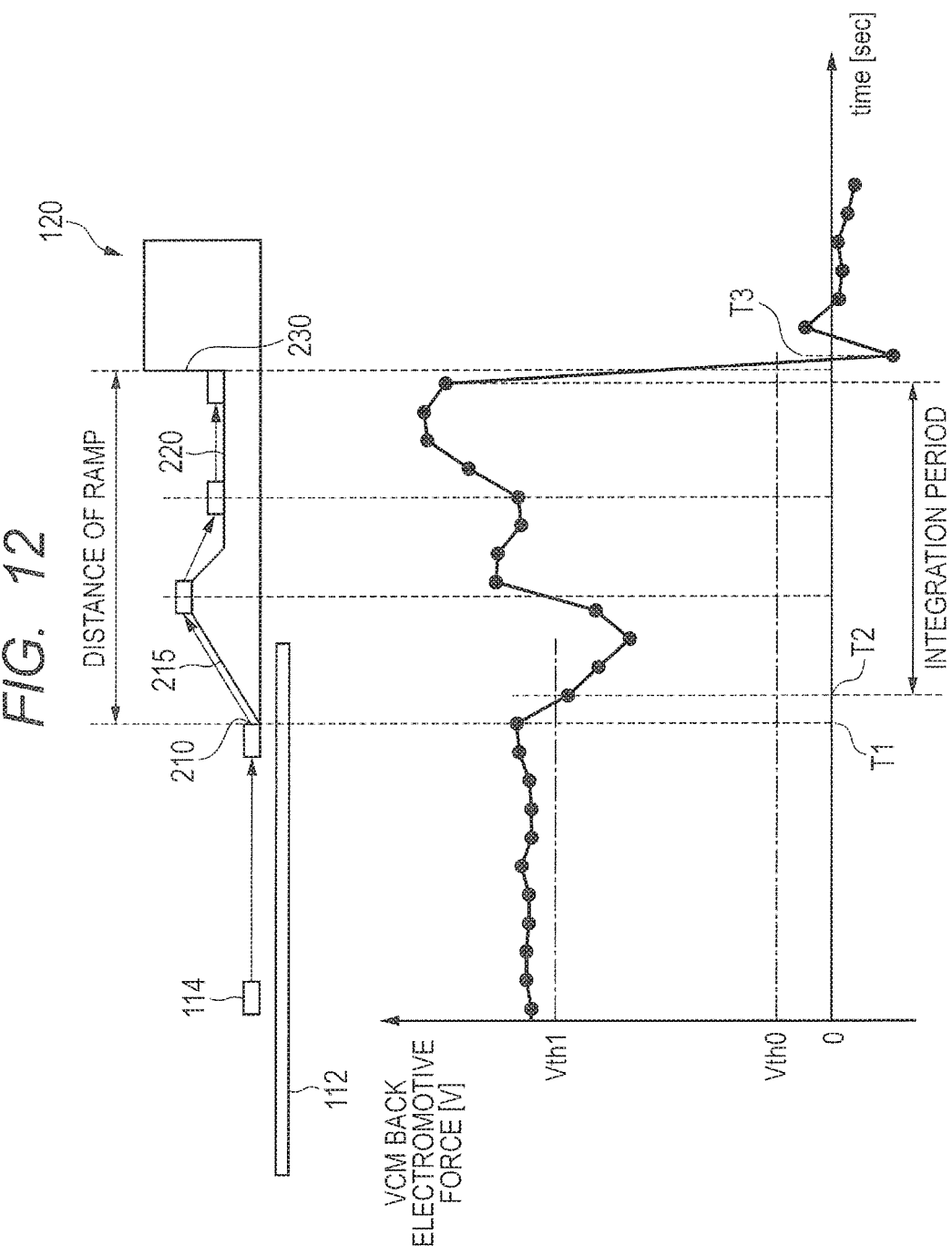
FIG. 12 is a diagram for explaining a relationship between a VCM back electromotive force and a position of a magnetic head according to the third embodiment.

FIG. 12 is a diagram for explaining a relationship between the VCM back electromotive force and the position of the magnetic head 114 according to the third embodiment. Referring to FIG. 12, the magnitude of the VCM back electromotive force (that is, the moving speed of the magnetic head 114) is maintained substantially constant until the magnetic head 114 reaches the ramp front 210 at time T1.

The moving speed of the magnetic head 114 temporarily decreases when the magnetic head 114 passes through the inclined surface 215. Thereby, the VCM back electromotive force falls below a threshold voltage Vth1 at time T2 at which the magnetic head 114 begins to pass through the inclined surface 215. The VCM control circuit 764 according to the third embodiment determines that the magnetic head 114 reaches the ramp mechanism 120 (ramp front 210) at the time T2.

The magnetic head 114 passes through the inclined surface 215 and the retraction surface 220 and collides with the ramp end 230. At time T3 immediately after the collision between the magnetic head 114 and the ramp end 230, the moving speed of the magnetic head 114 becomes a negative value (the magnetic head 114 moves in a direction away from the ramp end 230). The VCM control circuit 764 determines that the magnetic head 114 reaches the ramp end 230 at the time T3 at which the VCM back electromotive force fails below the threshold voltage Vth0 (for example, 50 mV).

In this way, the VCM control circuit 764 according to the third embodiment determines whether or not the magnetic head 114 reaches the ramp front 210 and the ramp end 230 based on the magnitude of the VCM back electromotive force. The VCM control circuit 764 uses these determination results to control the retraction operation.

Figure 13:
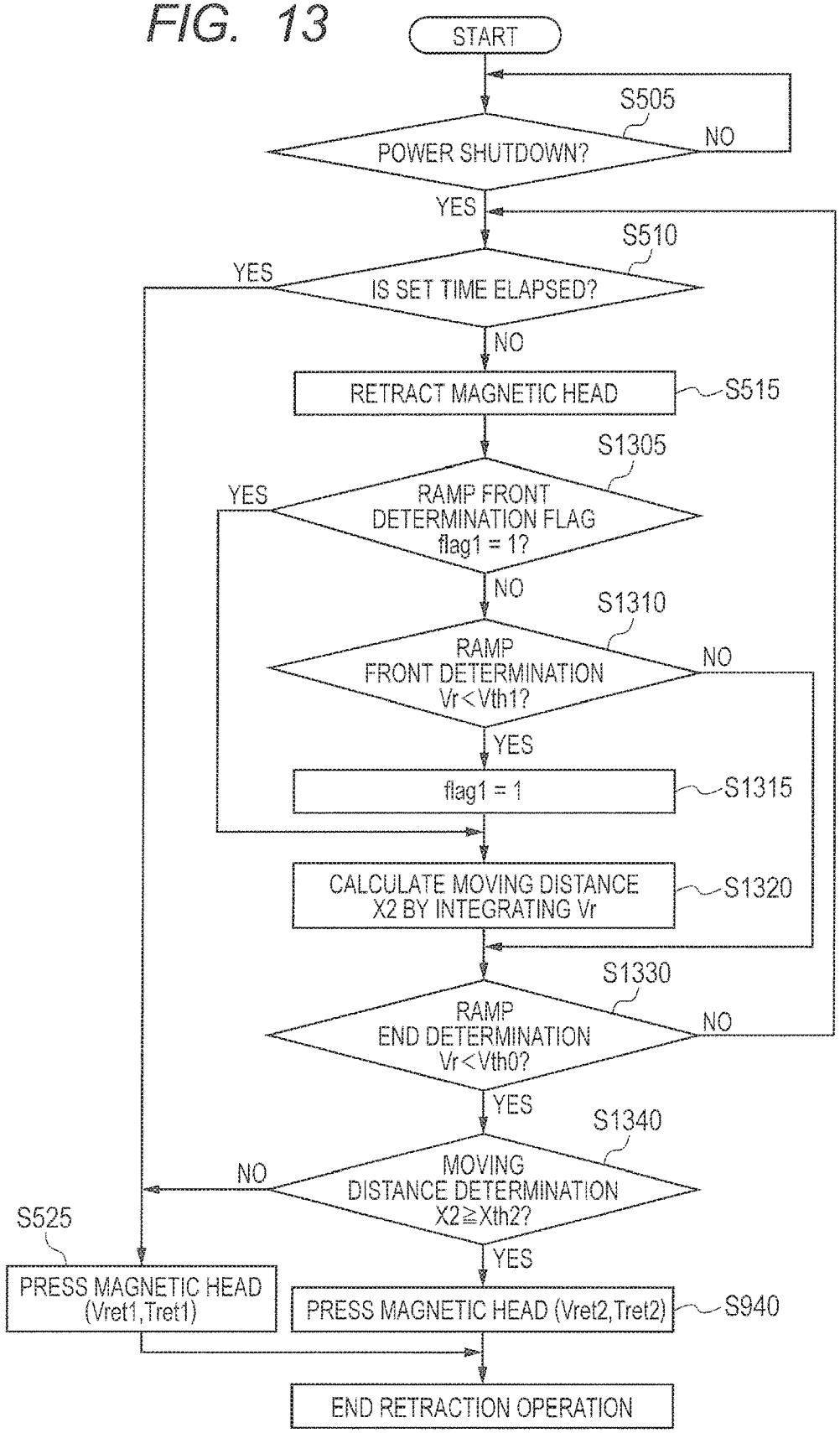
FIG. 13 is a flowchart for explaining control of a retraction operation according to the third embodiment.

FIG. 13 is a flowchart for explaining the control of the retraction operation according to the third embodiment. Parts to which the same reference numerals as those in FIG. 10 are given are the same as those described above, so that the parts will not be described again.

In step S1305, the VCM control circuit 764 determines whether or not a ramp front flag (flag1) is "1". It is assumed that the initial value of the flag1 is set to "0".

When the VCM control circuit 764 determines that the flag1 is "1" (YES in step S1305), the VCM control circuit 764 advances the processing to step S1320. Otherwise (NO in step S1305), the VCM control circuit 764 advances the processing to step S1310.

In step S1310, the VCM control circuit 764 determines whether or not the VCM back electromotive force Vr falls below the threshold voltage Vth1. In other words, the VCM control circuit 764 determines whether or not the magnetic head 114 reaches the ramp mechanism 120, When the VCM control circuit 764 determines that the magnetic head 114 reaches the ramp mechanism 120 (YES in step S1310), the VCM control circuit 764 advances the processing to step S1315. Otherwise (NO in step S1310), the VCM control circuit 764 advances the processing to step S1330.

In step S1315, the VCM control circuit 764 sets the flag1 to "1". Thereby, the VCM control circuit 764 determines that the flag1 is "1" in step S1305 and advances the processing to step S1320.

In step S1320, the integration circuit 766 integrates the VCM back electromotive force Vr used as speed information of the magnetic head 114 and the moving distance calculation circuit 768 calculates a moving distance X2 of the magnetic head 114. The moving distance X2 corresponds to a distance from the ramp front 210 to the magnetic head 114.

In step S1330, the VCM control circuit 764 determines whether or not the VCM back electromotive force Vr is lower than the threshold voltage Vth0 (for example, 50 mV). That is, the VCM control circuit 764 determines whether or not the magnetic head 114 reaches the ramp end 230 based on the magnitude of the VCM back electromotive force. When the VCM control circuit 764 determines that the magnetic head 114 reaches the ramp end 230 (YES in step S1330), the VCM control circuit 764 advances the processing to step S1340. Otherwise (NO in step S1330), the VCM control circuit 764 returns the processing to step S510. The threshold voltages Vth0 and Vth1 are held by the VCM control circuit 764 or another device.

In step S1340, the VCM control circuit 764 determines whether or not the moving distance X2 (corresponding to a distance by which the magnetic disk 114 moves during a period from time T2 to time T3 in FIG. 12) is greater than or equal to a threshold distance Xth2. In a certain aspect, the threshold distance Xth2 is set to the second distance (the distance from the ramp front 210 to the ramp end 230). That is, the VCM control circuit 764 determines whether or not the magnetic disk 114 reaches the ramp end 230 based on the moving distance X2. When the VCM control circuit 764 determines that the magnetic disk 114 reaches the ramp end 230 (YES in step S1340), the VCM control circuit 764 advances the processing to step S940. Otherwise (NO in step S1340), the VCM control circuit 764 advances the processing to step S525.

According to the above description, the motor driver IC according to the third embodiment does not move the magnetic head 114 to the stop position in the retraction operation. Therefore, the motor driver IC according to the third embodiment can more reduce the power consumption required for the retraction operation than the motor driver ICs according to the first and the second embodiments.

In another aspect, the motor driver IC according to the third embodiment may perform control to move the magnetic head 114 toward the center of the magnetic disk 112 by a predetermined distance between step S505 and step S510 in FIG. 13. In a certain aspect, the predetermined distance may be a distance required for the magnetic head 114 to accelerate to a retract speed required for the magnetic head 114 to pass through the inclined surface 215. In other words, the predetermined distance is a distance required for the magnetic head 114 to reach a target retract speed at a time point when the magnetic head 114 reaches the ramp front 210. Thereby, the motor driver IC can more reliably perform a ramp front determination in step S1310 in FIG. 13.

[F. Fourth Embodiment]

In the third embodiment, whether or not the magnetic head 114 reaches the ramp front 210 is determined based on the magnitude of the VCM back electromotive force. In a fourth embodiment, this determination is performed based on the magnitude of the VCM drive voltage.

Figure 14:
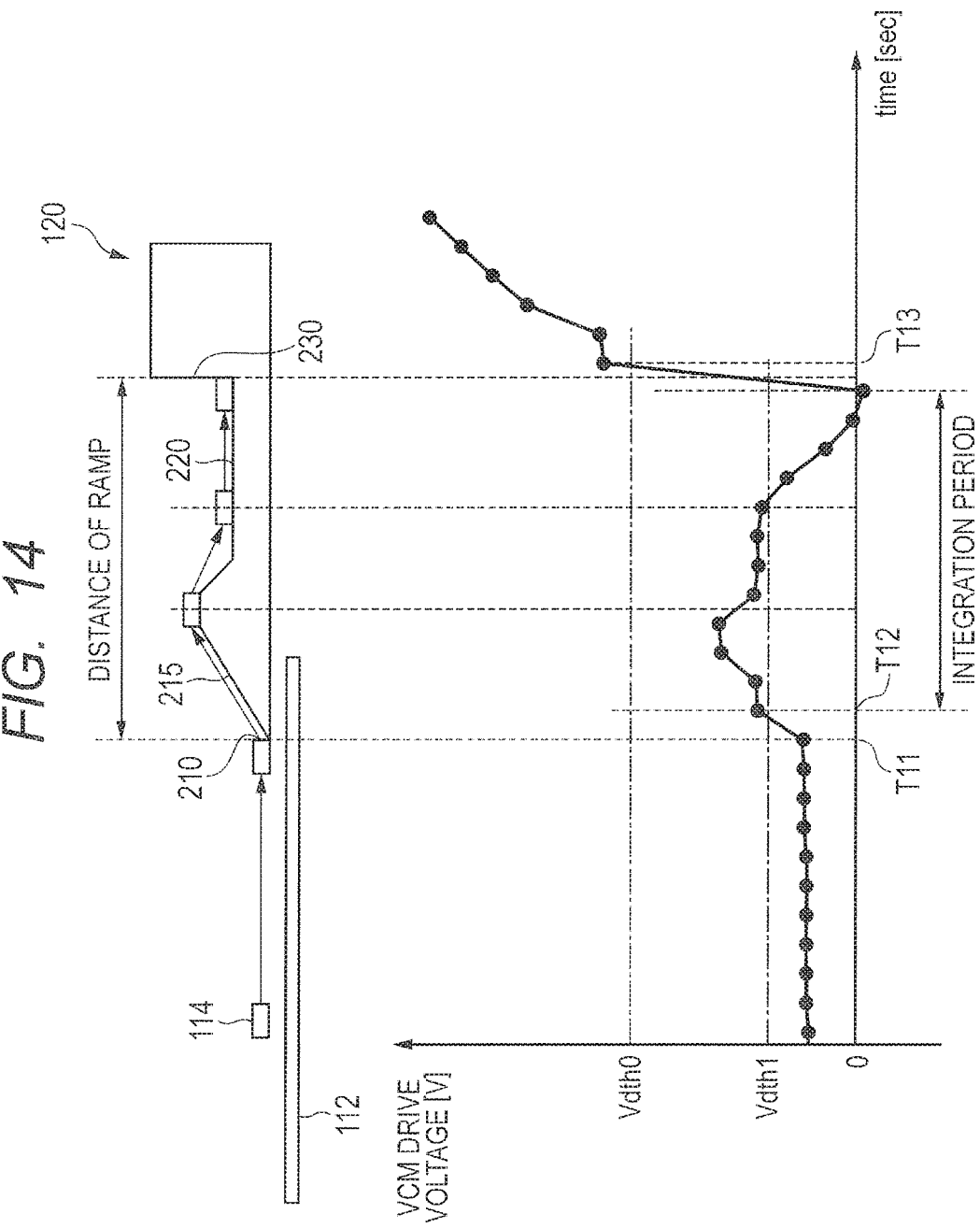
FIG. 14 is a diagram for explaining a relationship between a VCM drive voltage and a position of a magnetic head according to a fourth embodiment.

FIG. 14 is a diagram for explaining a relationship between the VCM drive voltage and the position of the magnetic head 114 according to the fourth embodiment. Referring to FIG. 14, the magnitude of the VCM drive voltage is maintained substantially constant until the magnetic head 114 reaches the ramp front 210 at time T11.

The VCM control circuit 764 performs control so as to maintain constant the moving speed of the magnetic head 114 when the magnetic head 114 passes through the inclined surface 215. Therefore, the VCM drive voltage rises temporarily when the magnetic head 114 passes through the inclined surface 215.

Thereby, the VCM drive voltage exceeds a threshold voltage Vdth1 at time T12 at which the magnetic head 114 begins passing through the inclined surface 215. The VCM control circuit 764 according to the fourth embodiment determines that the magnetic head 114 reaches the ramp mechanism. 120 (ramp front 210) at the time T12.

The moving speed of the magnetic head 114 becomes substantially zero by collision between the magnetic head 114 and the ramp end 230. The VCM control circuit 764 largely increases the VCM drive voltage in order to maintain constant the moving speed of the magnetic head 114. Thereby, the VCM drive voltage exceeds a threshold voltage Vdth0 at time T13 immediately after the collision between the magnetic head 114 and the ramp end 230. The VCM control circuit. 764 according to the fourth embodiment determines that the magnetic head 114 reaches the ramp end 230 at the time T13.

In this way, the VCM control circuit 764 according to the fourth embodiment determines whether or not the magnetic head 114 reaches the ramp front 210 and the ramp end 230 based on the magnitude of the VCM drive voltage. The VCM control circuit 764 uses these determination results to control the retraction operation.

Figure 15:
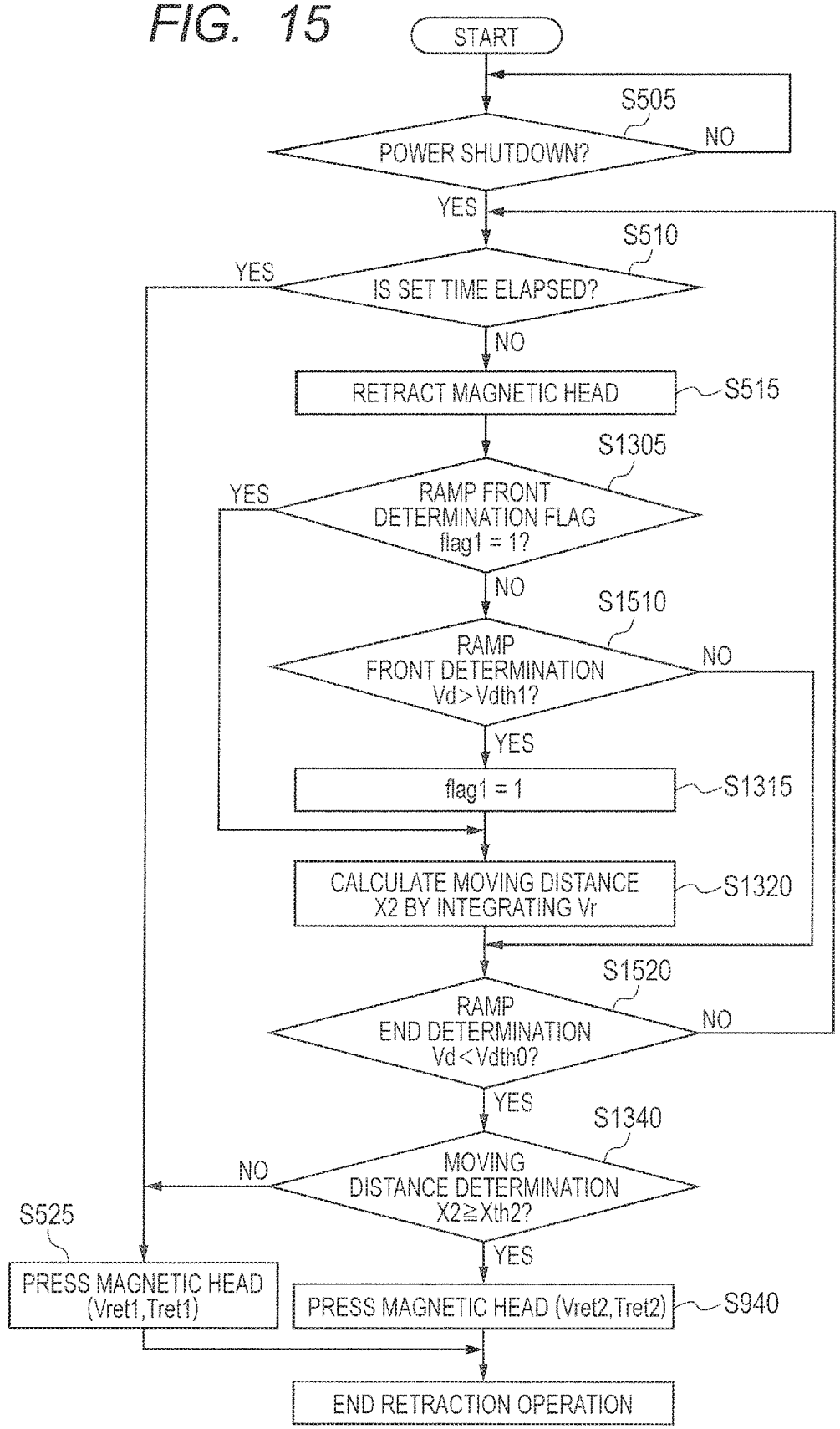
FIG. 15 is a flowchart for explaining control of a retraction operation according to the fourth embodiment.

FIG. 15 is a flowchart for explaining control of the retraction operation according to the fourth embodiment. Parts to which the same reference numerals as those in FIG. 13 are given are the same as those described above, so that the parts will not be described again.

In step S1510, the VCM control circuit 764 determines whether or not the VCM drive voltage Vd falls below the threshold voltage Vdth1. In other words, the VCM control circuit 764 determines whether or not the magnetic head 114 reaches the ramp mechanism 120.

When the VCM control circuit 764 determines that the magnetic head 114 reaches the ramp mechanism 120 (YES in step S1510), the VCM control circuit 764 advances the processing to step S1315 and sets the flag1 to "1". Otherwise (NO in step S1510), the VCM control circuit 764 advances the processing to step S1520.

In step S1520, the VCM control circuit 764 determines whether or not the VCM drive voltage Vd is lower than the threshold voltage Vdth0 (for example, 50 mV). That is, the VCM control circuit 764 determines whether or not the magnetic head 114 reaches the ramp end 230 based on the magnitude of the VCM drive voltage. When the VCM control circuit 764 determines that the magnetic head 114 reaches the ramp end 230 (YES in step S1520), the VCM control circuit 764 advances the processing to step S1340. Otherwise (NO in step S1520), the VCM control circuit 764 returns the processing to step S510.

In step S1340, the VCM control circuit 764 determines whether or not the moving distance X2 (corresponding to a distance by which the magnetic disk 114 moves during a period from time T12 to time T13 in FIG. 14) is greater than or equal to a threshold distance (for example, 95% or more of the second distance). That is, the VCM control circuit 764 determines whether or not the magnetic disk 114 reaches the ramp end 230 based on the moving distance X2. When the VCM control circuit 764 determines that the magnetic disk 114 reaches the ramp end 230 (YES in step S1340), the VCM control circuit 764 advances the processing to step S940. Otherwise (NO in step S1340), the VCM control circuit 764 advances the processing to step S525.

According to the above description, the motor driver IC according to the fourth embodiment, does not move the magnetic head 114 to the stop position in the retraction operation. Therefore, the motor driver IC according to the fourth embodiment can more reduce the power consumption required for the retraction operation than the motor driver ICs according to the first and the second embodiments.

The motor driver IC may determine whether or not the magnetic head 114 reaches the ramp front 210 based on a value of electric current flown in the VCM 116 or an electric power supplied to the VCM 116 instead of the magnitude of the VCM drive voltage.

[G. Modified Example]

(g1. Configuration)

Figure 16:
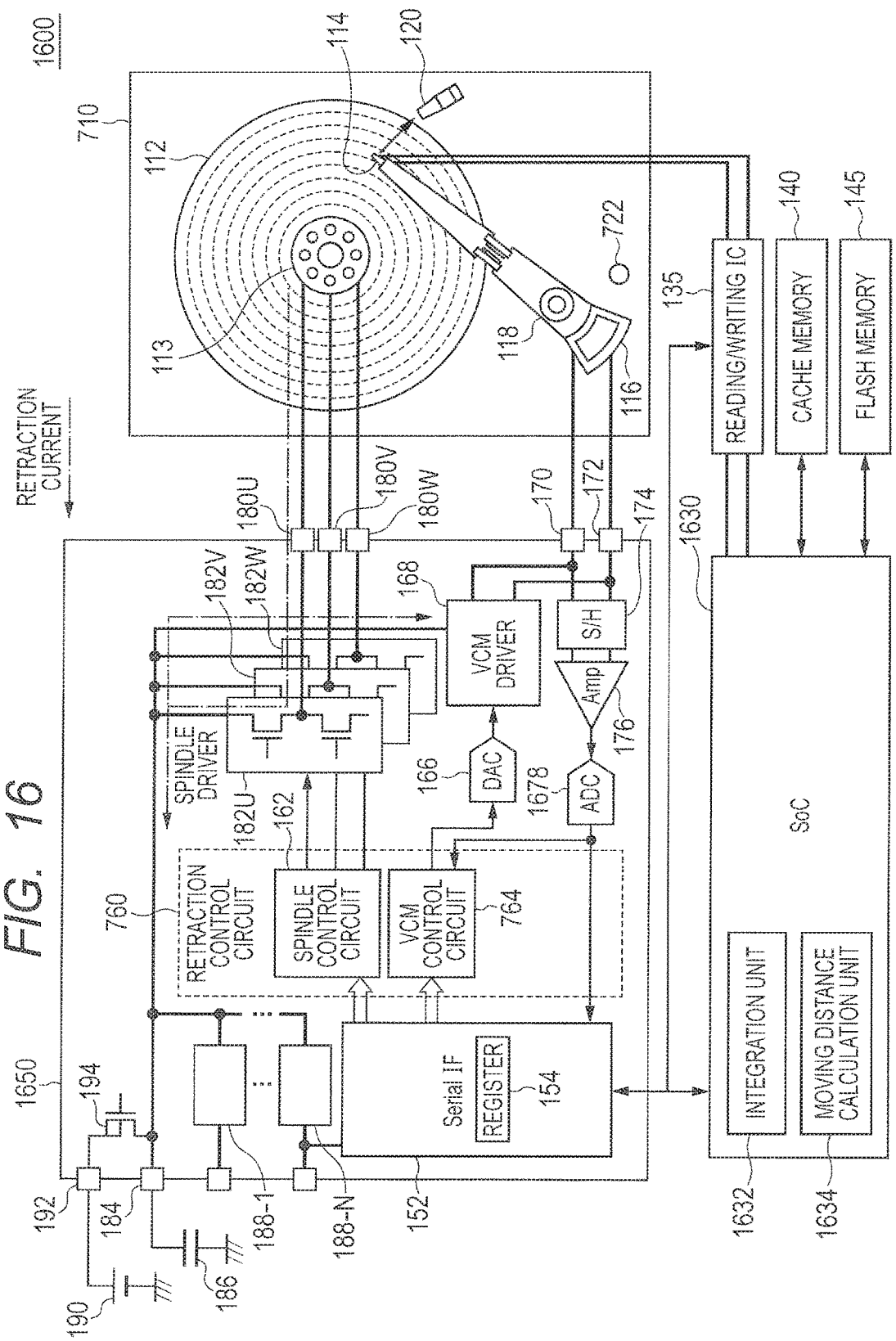
FIG. 16 is a diagram for explaining a configuration example of a control system according to a modified example.

FIG. 16 is a diagram for explaining a configuration example of a control system 1600 according to a modified example. In the control system 700 according to the first to the fourth embodiments, the motor driver IC 750 integrates the VCM back electromotive force of the magnetic head 114 and calculates the moving distance of the magnetic head 114. However, in the control system 1600, a SoC 1630 performs the above processing.

The SoC 1630 is different from the SoC 130 in that the SoC 1630 includes an integration unit 1632 and a moving distance calculation unit 1634. The SoC 1630 functions as the integration unit 1632 and the moving distance calculation unit 1634 by executing a control program stored in a storage device (not shown in the drawings).

The integration unit 1632 integrates the VCM back electromotive force inputted from an ADC 1678 through the interface 152. The moving distance calculation unit 1634 calculates the moving distance of the magnetic head 114 by multiplying a calculation result inputted from the integration unit 1632 by a predetermined coefficient. The moving distance calculation unit 1634 outputs the calculated moving distance of the magnetic head 114 to the VCM control circuit 764 through the interface 152.

In this way, the calculation processing of the moving distance of the magnetic head 114 may be performed by the SoC 1630. In further another aspect, the SoC 1630 may perform determination whether or not the moving distance of the magnetic head 114 reaches a predetermined distance (for example, step S930 and step S1340) in addition to the calculation processing of the moving distance of the magnetic head 114.

(g2. Determination Based on Change)

In the second to the fourth embodiments, a relationship between the VCM back electromotive force or the VCM drive voltage and a threshold value is used to determine whether or not the magnetic head 114 reaches the ramp front 210 and the ramp end 230.

In another aspect, the VCM control circuit 764 may be configured to perform the above determination based on a relationship between the magnitude of change (differential value) in the VCM back electromotive force or the VCM drive voltage and a threshold value.

In this configuration, the VCM control circuit 764 according to the second and the third embodiments performs the above determination based on change in the VCM back electromotive force, that is, change in the moving speed of the magnetic head 114. However, when a cycle of speed control (a cycle in which the Drive period, the Hiz period, and the det period are repeated) is short, the change in the moving speed of the magnetic head 114 is small, so that the above determination may be difficult.

On the other hand, the VCM control circuit 764 according to the fourth embodiment performs the above determination based on change in the VCM drive voltage. Even when the cycle of speed control is short, the change in the VCM drive voltage is greater than the change in the VCM back electromotive force, so that the change in the VCM drive voltage can be easily detected. Therefore, when the VCM control circuit 764 performs the determination based on change, it is preferable that the VCM control circuit 764 performs control based on the change in the VCM drive voltage.

(g3. Speed Information)

In the above embodiments 1 to 4, the control system is configured to integrate the VCM back electromotive force when calculating the moving distance of the magnetic head 114.

In another aspect, the control system is configured to calculate the moving distance of the magnetic head 114 by integrating a current flowing in the coil of the VCM 116 in the det period. This is because a value of current flowing in the VCM 116 is also a value proportional to the VCM back electromotive force, that is, a value proportional to the moving speed of the magnetic head 114.

(g4. Calculation of Moving Distance)

In the above examples, when the control system calculates the moving distance of the magnetic head 114, the control system uses the speed information of the magnetic head 114 (the VCM back electromotive force or a value of current flowing in the VCM 116). In another aspect, the control system may use the amount of change in rotation angle of the VCM 116.

The control system according to the other aspect is configured to be able to measure the rotation angle of the VCM 116. As an example, the control system is configured to be able to measure the rotation angle of the VCM 116 by a combination of a Hall element and a Hall voltage detection circuit arranged in the VCM 116, an optical rotary encoder, or the like.

The control system calculates the moving distance of the magnetic head 114 based on the amount of change in the rotation angle of the VCM 116 from when the magnetic head 114 reaches a predetermined position (for example, the stop position or the position of the ramp front 210).

The control described above can be implemented by at least one semiconductor integrated circuit such as a processor, at least one application specific integrated circuit ASIC (Application Specific Integrated Circuit), at least one DSP (Digital Signal Processor), at least one FPGA (Field Programmable Gate Array), and/or a circuit including a circuit having other calculation functions.

These circuits can realize various controls by reading one or more instructions from at least one tangible readable medium.

Such a medium has a form such as a magnetic medium (for example, a hard disk), an optical medium (for example, a compact disk (CD) and a DVD), and any type of memory such as a volatile memory and a non-volatile memory. However, the medium is not limited to these forms.

The volatile memory may include a DRAM (Dynamic Random Access Memory) and a SRAM (Static Random Access Memory). The non-volatile memory may include a ROM and an NVRAM. A semiconductor memory can be a part of a semiconductor circuit along with at least one processor.

While the invention made by the inventors has been specifically described based on the embodiments, it is needless to say that the present invention is not limited to the embodiments and may be variously modified without departing from the scope of the invention.

What is claimed is:

1. A control device for controlling a disk storage device, wherein the disk storage device includes
    a disk for storing data,
    a head for reading data stored in the disk or writing data to the disk,
    a motor for moving the head in a radial direction of the disk, and
    a ramp mechanism including an inclined surface, the ramp mechanism being for preventing the head and the disk from coming into contact with each other by causing the head to pass through the inclined surface,
wherein the control device includes
    a control unit that controls the motor and retracts the head from over the disk to the ramp mechanism when power supply is shut down,
    an acquisition unit that acquires information related to a moving distance of the head that retracts to the ramp mechanism, and a calculation unit that calculates the moving distance of the head based on the information acquired by the acquisition unit, and wherein the control unit is configured to continue an operation of the motor in a same direction by switching from a first retract operation to a second retract operation when determining that the head reaches a first position after passing through the inclined surface of the ramp mechanism based on the moving distance calculated by the calculation unit.

2. The control device according to claim 1, wherein the control unit supplies power to the motor to retract the head at a predetermined speed in the first retract operation.

3. The control device according to claim 1, wherein the control unit applies a predetermined voltage to the motor for a predetermined period of time in the second retract operation.

4. The control device according to claim 1, wherein the information related to the moving distance of the head includes a value related to a back electromotive force generated in a coil of the motor.

5. The control device according to claim 4, wherein the calculation unit calculates the moving distance by integrating a value related to the back electromotive force.

6. The control device according to claim 1, wherein the information related to the moving distance of the head includes a rotation angle of the motor.

7. The control device according to claim 1, wherein the calculation unit calculates the moving distance of the head after the head reaches a second position.

8. The control device according to claim 7, wherein the disk storage device further includes a stop mechanism for stopping movement of the head, and wherein the second position includes a position of the head when the movement of the head is stopped by the stop mechanism.

9. The control device according to claim 7, wherein the second position includes a position at which the head reaches the ramp mechanism.

10. The control device according to claim 9, wherein the information related to the moving distance of the head includes a value related to a back electromotive force generated in a coil of the motor, wherein the control unit determines that the head reaches the ramp mechanism based on the value related to the back electromotive force, and wherein the calculation unit calculates the moving distance of the head after the control unit determines that the head reaches the ramp mechanism.

11. The control device according to claim 9, wherein the control device supplies power to the motor to retract the head at a predetermined speed in the first retract operation, and determines that the head reaches the ramp mechanism based on a value related to the power supplied to the motor, and wherein the calculation unit calculates the moving distance of the head after the control unit determines that the head reaches the ramp mechanism.

12. A magnetic disk control system comprising:

a magnetic disk for storing data;

a first motor for rotating the magnetic disk;

a magnetic head for reading data stored in the magnetic disk or writing data to the magnetic disk;

a second motor for moving the magnetic head in a radial direction of the magnetic disk;

a ramp mechanism including an inclined surface, the ramp mechanism being for preventing the magnetic head and the magnetic disk from coming into contact with each other by causing the magnetic head to pass through the inclined surface; and a control device for controlling the second motor, wherein the control device includes a control unit that controls the second motor and retracts the magnetic head from over the magnetic disk to the ramp mechanism when power supply is shut down, an acquisition unit that acquires information related to movement of the magnetic head that retracts to the ramp mechanism, and a calculation unit that calculates a moving distance of the magnetic head based on the information acquired by the acquisition unit, and wherein the control unit is configured to continue an operation of the second motor in a same direction by switching from a first retract operation to a second retract operation when determining that the magnetic head reaches a first position after passing through the inclined surface of the ramp mechanism based on the moving distance calculated by the calculation unit.

13. A control method for controlling a disk storage device, wherein the disk storage device includes a disk for storing data, a head for reading data stored in the disk or writing data to the disk, a motor for moving the head in a radial direction of the disk, and a ramp mechanism including an inclined surface, the ramp mechanism being for preventing the head and the disk from coming into contact with each other by causing the head to pass through the inclined surface, wherein the control method includes the steps of retracting the head from over the disk to the ramp mechanism by controlling the motor when power supply to the disk storage device is shut down, acquiring information related to a moving distance of the head that retracts to the ramp mechanism, and calculating the moving distance of the head based on the information acquired by the step of acquiring the information, and wherein the step of retracting the head includes the steps of determining whether or not the head reaches a first position of the ramp mechanism based on the calculated moving distance, and continuing an operation of the motor in a same direction by switching from a first retract operation to a second retract operation when it is determined that the head reaches a first position after passing through the inclined surface of the ramp mechanism.

* * * * *